US012023962B2

(12) United States Patent
Hinami

(10) Patent No.: US 12,023,962 B2
(45) Date of Patent: Jul. 2, 2024

(54) TIRE FOR ROUGH TERRAIN

(71) Applicant: Sumitomo Rubber Industries, Ltd., Kobe (JP)

(72) Inventor: Yukiko Hinami, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 1 day.

(21) Appl. No.: 17/958,863

(22) Filed: Oct. 3, 2022

(65) Prior Publication Data
US 2023/0104245 A1    Apr. 6, 2023

(30) Foreign Application Priority Data
Oct. 6, 2021  (JP) .................................. 2021-164885

(51) Int. Cl.
*B60C 11/11*  (2006.01)
*B60C 11/13*  (2006.01)

(52) U.S. Cl.
CPC ........... *B60C 11/11* (2013.01); *B60C 11/1323* (2013.01); *B60C 2200/14* (2013.01)

(58) Field of Classification Search
CPC .............................. B60C 11/11; B60C 11/1323
See application file for complete search history.

(56) References Cited

U.S. PATENT DOCUMENTS

| | | | |
|---|---|---|---|
| 2011/0120605 A1 | 5/2011 | Nakamura | |
| 2011/0308681 A1* | 12/2011 | Nakamura | B60C 11/11 152/209.18 |
| 2012/0024440 A1* | 2/2012 | Ishida | B60C 11/11 152/209.1 |
| 2018/0147892 A1* | 5/2018 | Maeda | B60C 11/0311 |
| 2021/0237515 A1 | 8/2021 | Perrin et al. | |
| 2021/0300124 A1* | 9/2021 | Hikita | B60C 11/0302 |
| 2022/0371378 A1* | 11/2022 | Kobori | B60C 11/1315 |

FOREIGN PATENT DOCUMENTS

| | | | |
|---|---|---|---|
| EP | 3 909 788 A1 | 11/2021 | |
| EP | 3 915 809 A1 | 12/2021 | |
| EP | 4 091 843 A1 | 11/2022 | |
| JP | 11-078427 A | * | 3/1999 |
| JP | 3384716 B2 | | 3/2003 |
| JP | 2007-112396 A | * | 5/2007 |

(Continued)

OTHER PUBLICATIONS

Machine translation for Japan 2020-111262 (Year: 2023).*

(Continued)

*Primary Examiner* — Steven D Maki
(74) *Attorney, Agent, or Firm* — Birch, Stewart, Kolasch & Birch, LLP

(57) ABSTRACT

A tire for running on rough terrain for which an intended tire rotational direction is specified. The tread portion is provided with blocks raised from a tread base portion. Each block has a first side wall surface comprising a radially outer portion extending substantially straight and radially inwardly, while inclining toward the toe side in the intended tire rotational direction, and a radially inner portion extending from the radially outer portion to the tread base portion while curving in an arc shape. The radially outer portion has a radial length of from 30% to 70% of a radial height of the block.

20 Claims, 9 Drawing Sheets

(56) References Cited

FOREIGN PATENT DOCUMENTS

| | | | |
|---|---|---|---|
| JP | 2020-111262 A | * | 7/2020 |
| JP | 2020-111265 A | | 7/2020 |
| JP | 6879409 B1 | | 6/2021 |

OTHER PUBLICATIONS

Machine translation for Japan 2007-112396 (Year: 2023).*
Machine translation for Japan 11-078427 (Year: 2023).*
Extended European Search Report for European Application No. 22197190.6, dated Feb. 1, 2023.

* cited by examiner

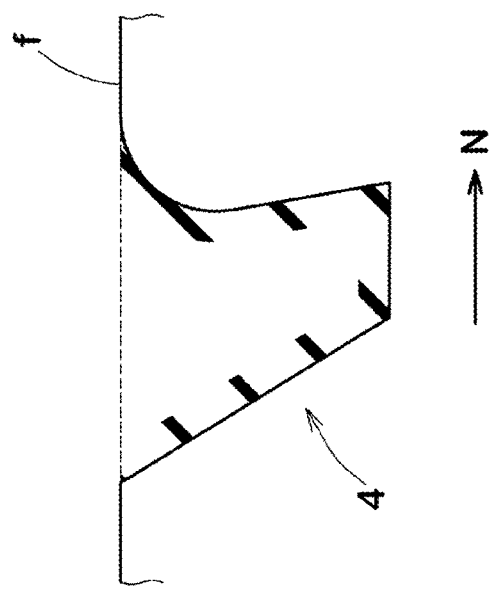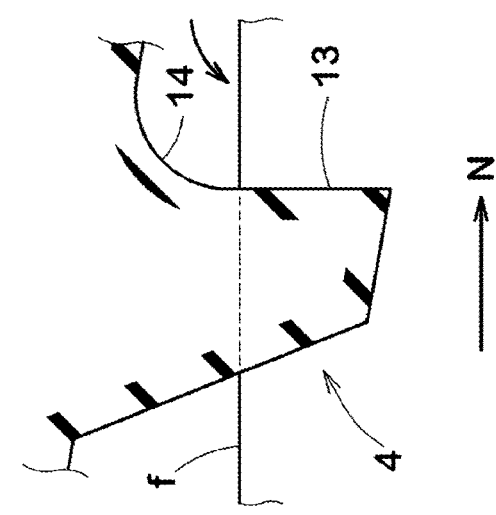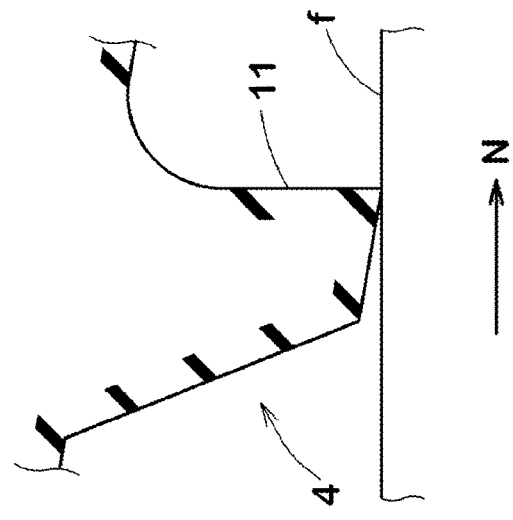

ical simple
TIRE FOR ROUGH TERRAIN

TECHNICAL FIELD

The present invention relates to a tire for rough terrain.

BACKGROUND ART

The following Patent Document 1 discloses a pneumatic tire in which the tread portion is provided with blocks. The block has a ground contacting top surface having a heel-side edge, and a heel-side side wall surface extending radially inwardly from the heel-side edge while inclining toward the toe side in the tire rotation direction.

Such block is explained as being capable of exerting a large shearing force and deeply digging into mud or soft ground.

Patent Document 1: Japanese Patent No. 3384716.

SUMMARY OF THE INVENTION

Problems to be Solved by the Invention

In recent years, it is desired that tires for traveling on rough terrain have further improved traction performance on rough terrain.

The present invention was made in view of the above circumstances, and a primary object of the present invention is to provide a tire for running on rough terrain in which the traction performance on rough terrain can be further improved.

Means for Solving the Problems

According to the present invention, a tire for running on rough terrain for which an intended tire rotational direction is specified, comprises a tread portion provided with blocks raised from a tread base portion,
wherein
each of the blocks has a ground contacting top surface having a first edge extending in the tire axial direction on the heel side in the tire rotation direction, and a first side wall surface extending radially inwardly from the first edge,
wherein
in a vertical cross section of the block along the tire circumferential direction, the first side wall surface comprises
a radially outer portion extending substantially straight and radially inwardly from the first edge, while inclining toward the toe side in the intended tire rotational direction, and a radially inner portion extending from the radially outer portion to the tread base portion while curving in an arc shape, and
a length in the tire radial direction of the radially outer portion is in a range from 30% to 70% of a height of the block measured in the tire radial direction from the ground contacting top surface to the tread base portion.

Effects of the Invention

In the tire for running on rough terrain according to the present invention, the traction performance on rough terrain is further improved by the above configuration.

BRIEF DESCRIPTION OF THE DRAWINGS

FIGS. 3A to 3C are schematic cross-sectional views of the block 4 showing how the block is deeply pierced into the ground in chronological order.

DETAILED DESCRIPTION OF THE INVENTION

The present invention is suitably applied to a tire for a motorcycle, but may be applied to tires for passenger cars, heavy duty vehicles and the like.

Further, the present invention can be applied to not only pneumatic tires but also non-pneumatic tires so called airless tires.

Hereinafter, an embodiment of the present invention will be described in detail with reference to the accompanying drawings.

Figure 1:
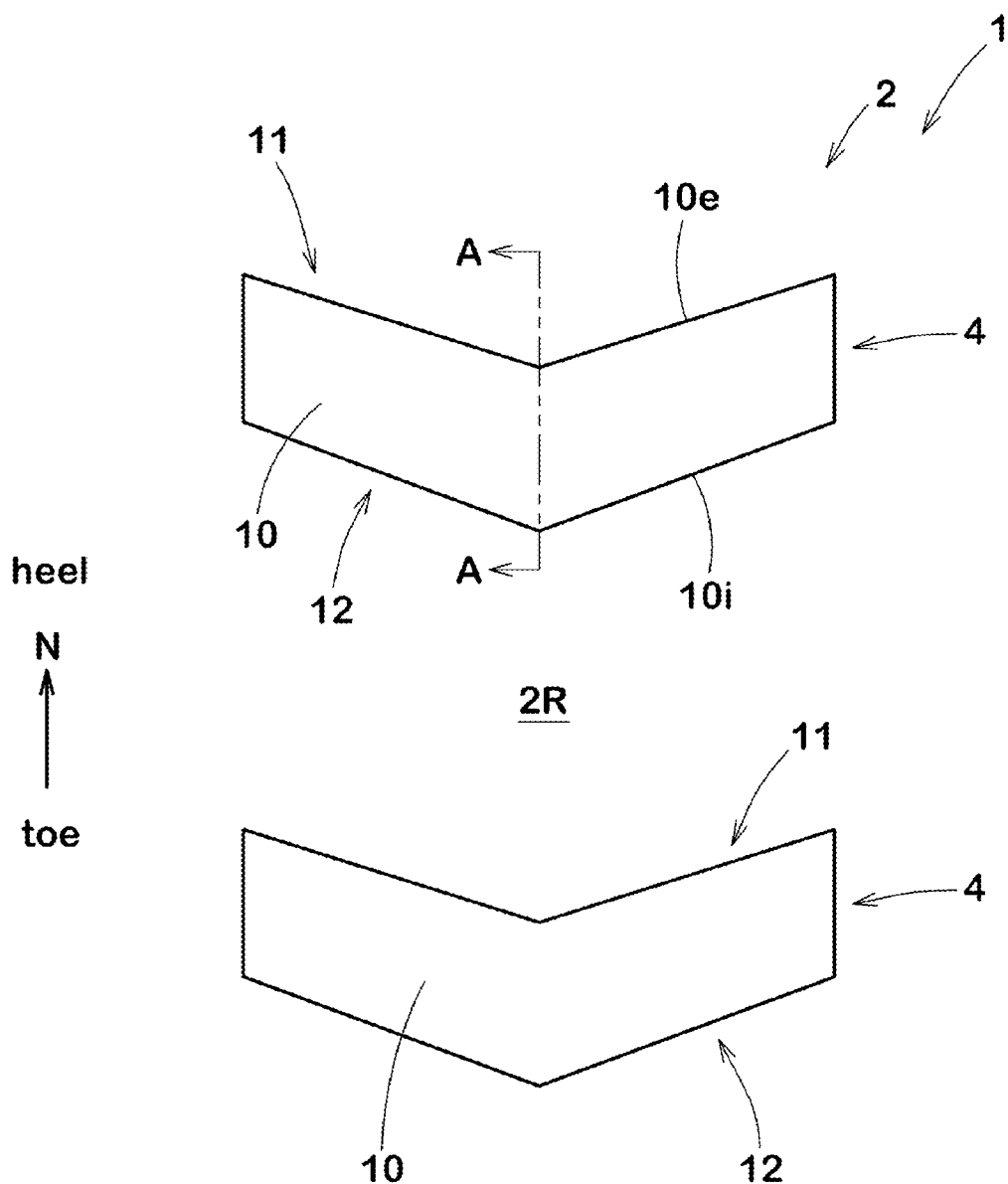
FIG. 1 is a partial plan view of a tread portion of a tire for running on rough terrain showing a conceptual simple example of the block according to the present invention.

FIG. 1 is a partial plan view of a tread portion of a tire for running on rough terrain showing a conceptual simple example of the block according to the present invention.

According to the present invention, the tire 1 for running on rough terrain has an intended tire rotational direction N specified therefor.

The tire 1 comprises a tread portion provided with blocks 4 raised from a tread base portion 2R.

FIG. 1 shows the top view of a conceptual simple example of the block 4.

According to the present invention, the planar shape of the block 4 is not limited to such example, and various shapes may be adopted.

Each of the blocks 4 has: a ground contacting top surface 10 having a first edge 10e extending in the tire axial direction on the heel side in the intended tire rotation direction N; and a first side wall surface 11 extending radially inwardly from the first edge 10e.

The shape of the ground contacting top surface 10 of the block 4 is not limited to the one shown in FIG. 1, and various shapes may be adopted.

Figure 2:
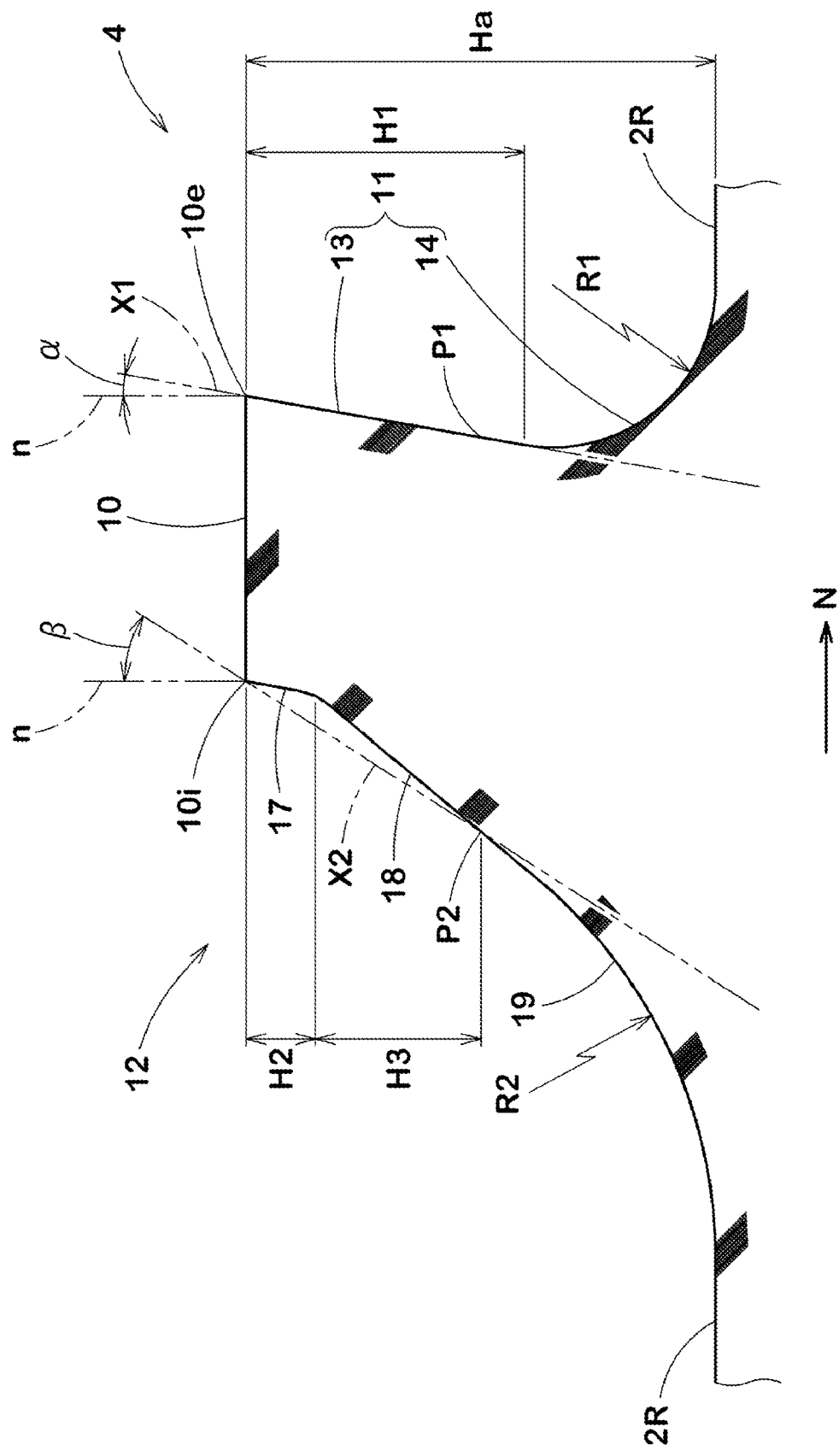
FIG. 2 is a cross-sectional view taken along line A-A of FIG. 1.

FIG. 2 is a cross-sectional view of the block 4 taken along line A-A of FIG. 1. This cross-sectional view shows a vertical cross section parallel to the tire circumferential direction.

This vertical cross section is at the mid position of the block 4 in the tire axial direction.

In the vertical cross section, the first side wall surface 11 comprises a radially outer portion 13 and a radially inner portion 14 as shown in FIG. 2.

The radially outer portion 13 extends substantially straight and radially inwardly from the first edge 10e, while inclining toward the toe side in the intended tire rotation direction N at an inclination angle with respect to a straight line "n" drawn normally to the top surface 10 at the first edge 10e.

The radially inner portion 14 extends from the radially outer portion 13 to the tread base portion 2R in an arc shape.

FIGS. 3A to 3C schematically show how the block 4 can be deeply pierced into the ground (f) in chronological order.

In the first side wall surface 11, as shown in FIGS. 3A to 3C, the force due to the tire rotation is applied to the radially outer portion 13 as a rotational force with the arc-shaped radially inner portion 14 as a fulcrum, and can exert an increased shear force. As a result, the first side wall surface 11 can be deeply pierced into the ground (f).

Here, the expression "extend substantially straight" means to extend parallel to not only a perfect straight line having an infinite radius of curvature but also an arc line having a radius of curvature of at least 200 mm.

As shown in FIG. 2, the length H1 in the tire radial direction of the radially outer portion 13 is in a range from 30% to 70% of the block height Ha of the block 4 in the tire radial direction from the ground contacting top surface 10 to the tread base portion 2R. Since the length H1 is 30% or more of the block height Ha, the radially outer portion 13 can be deeply pierced into the ground (f).

Since the length H1 is 70% or less of the block height Ha, the radially inner portion 14 is suppressed from becoming smaller, and the rigidity of the radially inner portion 14 is maintained high, so the first side wall surface 11 is suppressed from falling to the toe side of the intended tire rotation direction N.

Further, such first side wall surface 11 suppresses the radially inner portion 14 from cracking or chipping.

Therefore, the block 4 according to the present embodiment can improve the traction performance on rough terrain and can sustain this effect for a long time.

Further, such block 4 enhances the instantaneous force on rough terrain.

From such view points, the length H1 of the radially outer portion 13 is preferably not less than 40%, but preferably not more than 60% of the block height Ha of the block 4.

In this application including specification and claims, various dimensions, positions and the like of the tire 1 refer to those under the normal state of the tire unless otherwise noted.

The normal state is such that the tire is mounted on a standard wheel rim and inflate to a standard pressure but loaded with no tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure is the air pressure for the tire specified by the same organization in the Air-pressure/Maximum-load Table or similar list, i.e. the "maximum air pressure" in JATMA, the "Inflation Pressure" in ETRTO, the maximum pressure given in the "Tire Load Limits at Various Cold Inflation Pressures" table in TRA or the like.

In the present embodiment, the radially inner portion 14 has a single radius of curvature.

Since such radially inner portion 14 relaxes the stress concentration acting on the radially inner portion 14, the traction performance is further enhanced.

The radially inner portion 14 may be formed by an arc having a multi-radius curvature.

The radius of curvature R1 of the radially inner portion 14 is preferably set in a range from 3 to 10 mm.

Since the radius of curvature Rs is 3 mm or more, the stress concentration acting on the radially inner portion 14 is reduced.

Since the radius of curvature R1 is 10 mm or less, the rigidity of the radially inner portion 14 is maintained high.

When the radially inner portion 14 is formed by a plurality of arcs having different radii of curvature, the radius of a circle passing through three points: the radially outermost end, the radially innermost end, and the intermediate point therebetween (not shown) of the radially inner portion 14 is adopted as the radius of curvature of the radially inner portion 14.

In the above-mentioned vertical cross section of the block 4,
the angle α of a first straight line X1 is preferably not more than 45 degrees with respect to the straight line "n" drawn normally to the top surface 10 at the first edge 10e, wherein the first straight line X1 is a straight line drawn from the first edge 10e to a position P1 on the first side wall surface 11 which is separated radially inwardly from the first edge 10e by 50% of the block height Ha of the block 4.

Thereby, the rigidity of the block 4 is ensured, and the first side wall surface 11 can be deeply pierced into the ground.

If the angle α is small, the amount of mud excavated during shearing may be small. From such a viewpoint, the angle α is preferably not less than 5 degrees, but preferably not more than 35 degrees, more preferably not more than 25 degrees.

The ground contacting top surface 10 of the block 4 has a second edge 10i extending in the tire axial direction on the toe side in the intended tire rotation direction N as shown in FIG. 1, and
the block 4 has a second side wall surface 12 extending radially inwardly from the second edge 10i as shown in FIG. 2.

In the above-mentioned vertical cross section, the second side wall surface 12 is inclined toward the toe side in the intended tire rotation direction N, while extending radially inwardly from the second edge 10i.

Such second side wall surface 12 increases the rigidity of the block 4 and prevents the block 4 from falling toward the toe side in the intended tire rotation direction N when the block 4 contacts with the ground.

The second side wall surface 12 in this example comprises
a first portion 17 extending radially inwardly from the second edge 10i,
a second portion 18 extending radially inwardly from the first portion 17 while inclining more gently than the first portion 17, and
a third portion 19 extending radially inwardly from the second portion 18 to the tread base portion 2R.

Each of the first portion 17 and the second portion 18 extends linearly.

The third portion 19 is curved in an arc shape.
The third portion 19 is curved concavely.
The length H2 in the tire radial direction of the first portion 17 is preferably not less than 5%, more preferably not less than 10%, but preferably not more than 25%, more preferably not more than 20% of the block height Ha of the block 4.

The length H3 in the tire radial direction of the second portion 18 is larger than the length H2 in the tire radial direction of the first portion 17.

The length H3 in the tire radial direction of the second portion 18 is preferably not less than 25%, more preferably not less than 30%, but preferably not more than 45%, more preferably not more than 40% of the block height Ha of the block 4.

The radius of curvature R2 of the third portion 19 is larger than the radius of curvature R1 of the radially inner portion 14 of the first side wall surface 11.

Thereby, the collapse of the block 4 at the time of contacting with the ground is further suppressed.

Although not particularly limited, the radius of curvature R2 of the third portion 19 is preferably not less than 10 mm, more preferably not less than 15 mm, but preferably not more than 30 mm, more preferably not more than 25 mm.

In the above-mentioned vertical cross section of the block 4, the angle β of a second straight line X2 with respect to a straight line "n" drawn normally to the top surface 10 at the second edge 10i, is preferably set to be larger than the above-mentioned angle α, wherein the second straight line X2 is a straight line drawn from the second edge 10i to a position P2 on the second side wall surface 12 separated radially inwardly from the second edge 10i by 50% of the block height Ha. Thereby, the collapse of the block 4 at the time of contacting with the ground is further suppressed.

In order to effectively derive the above-mentioned function, the angle β is preferably not less than 5 degrees, more preferably not less than 20 degrees, still more preferably not less than 30 degrees, but preferably not more than 75 degrees, more preferably not more than 60 degrees, still more preferably not more than 50 degrees.

Figure 4:
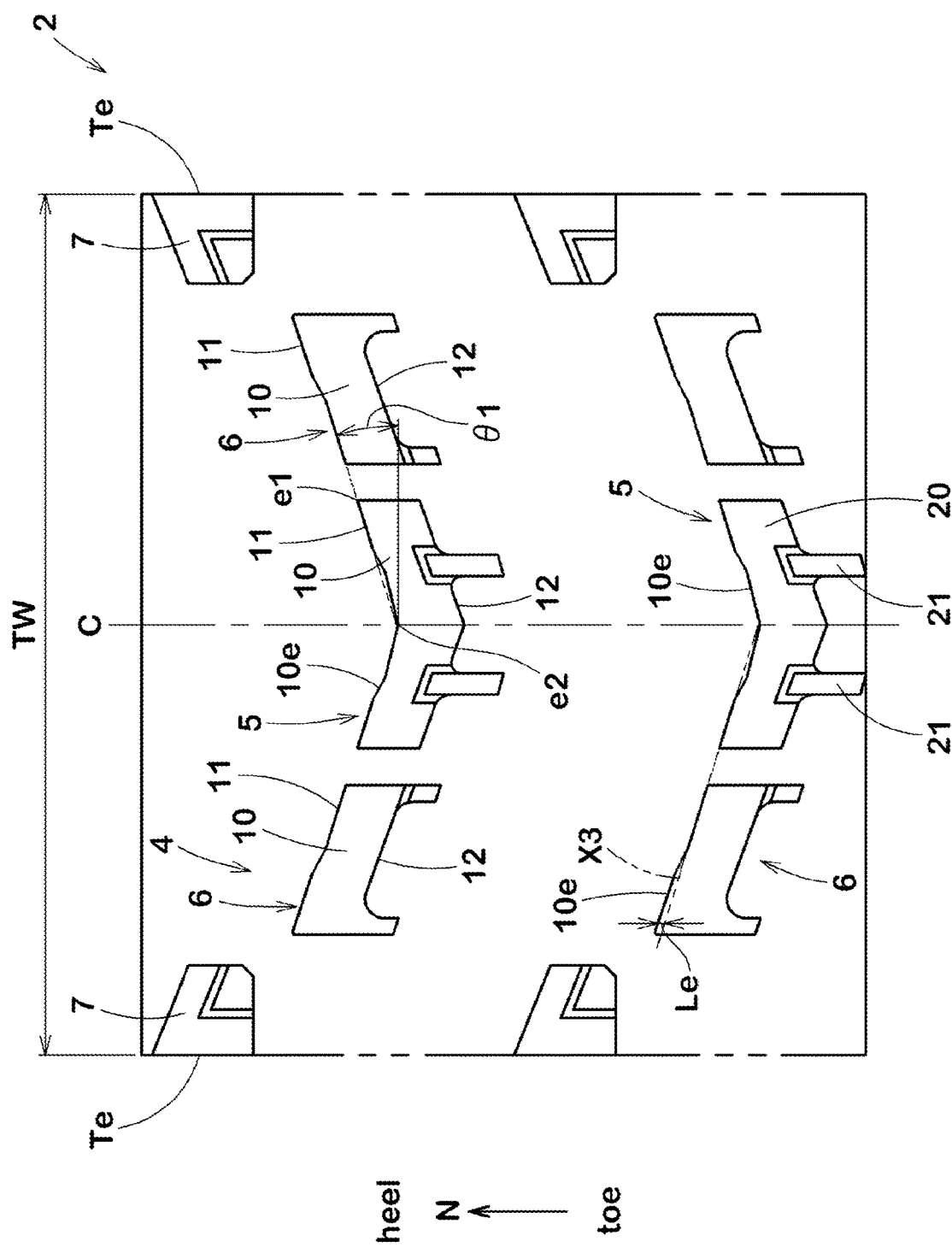
FIG. 4 is a developed partial view of the tread portion of the present embodiment.

FIG. 4 shows a more specific example of a tread portion 2 of the tire 1 according to the present invention.

In the present embodiment shown in FIG. 4, the above-described block 4 is modified and provided as crown blocks 5 disposed on the tire equator C and middle blocks 6 disposed axially outside the crown blocks 5.

In the present embodiment, the tread portion 2 is further provided with shoulder blocks 7 disposed axially outside the middle blocks 6.

In the present embodiment, the tread portion 2 or tread pattern is line-symmetrical with respect to the tire equator C.

In the present embodiment, each of the crown blocks 5 and the middle blocks 6 is provided with
the above-described first side wall surface 11 comprising the radially outer portion 13 and the radially inner portion 14, and
the above-described second side wall surface 12.

When running straight, mainly the crown blocks 5 and the middle blocks 6 contact with the ground, therefore, the tire 1 of the present embodiment is improved in the traction performance when running straight in particular.

The first edge 10e on the heel-side of the crown block 5 is formed in a V shape convex toward the toe side in the intended tire rotation direction N.

Since such crown block 5 can exert a large shearing force against mud, the traction performance is improved.

An angle θ1 of the first edge 10e with respect to the tire axial direction is preferably not less than 10 degrees, more preferably not less than 15 degrees, but preferably not more than 45 degrees, more preferably not more than 25 degrees. The angle θ1 is that of a straight line drawn from each of the axially outer ends e1 of the first edge 10e to the intermediate position e2 in the tire axial direction of the first edge 10e. The axially outer ends e1 are located on the heel side than the intermediate position e2. In the present embodiment, the intermediate position e2 is located on the tire equator C. In such crown block 5, the mud excavated by the first edge 10e can be collected at the center of the crown block 5 in the block width direction, and a larger shearing force can be exerted.

Each of the crown blocks 5 comprises
a crown block main portion 20 formed in a V shape convex toward the toe side in the intended tire rotation direction N, and
crown fin portions 21 protruding from the crown block main portion 20 toward the toe side in the intended tire rotation direction N.

In the crown block 5, when the crown block main portion 20 contacts with the ground, the crown fin portions 21 suppresses the crown block main portion 20 from collapsing toward the toe side, and the mud digging force is maintained. Thereby, the traction performance is improved.

For each crown block 5, only two crown fin portions 21 are provided.

Figure 5:
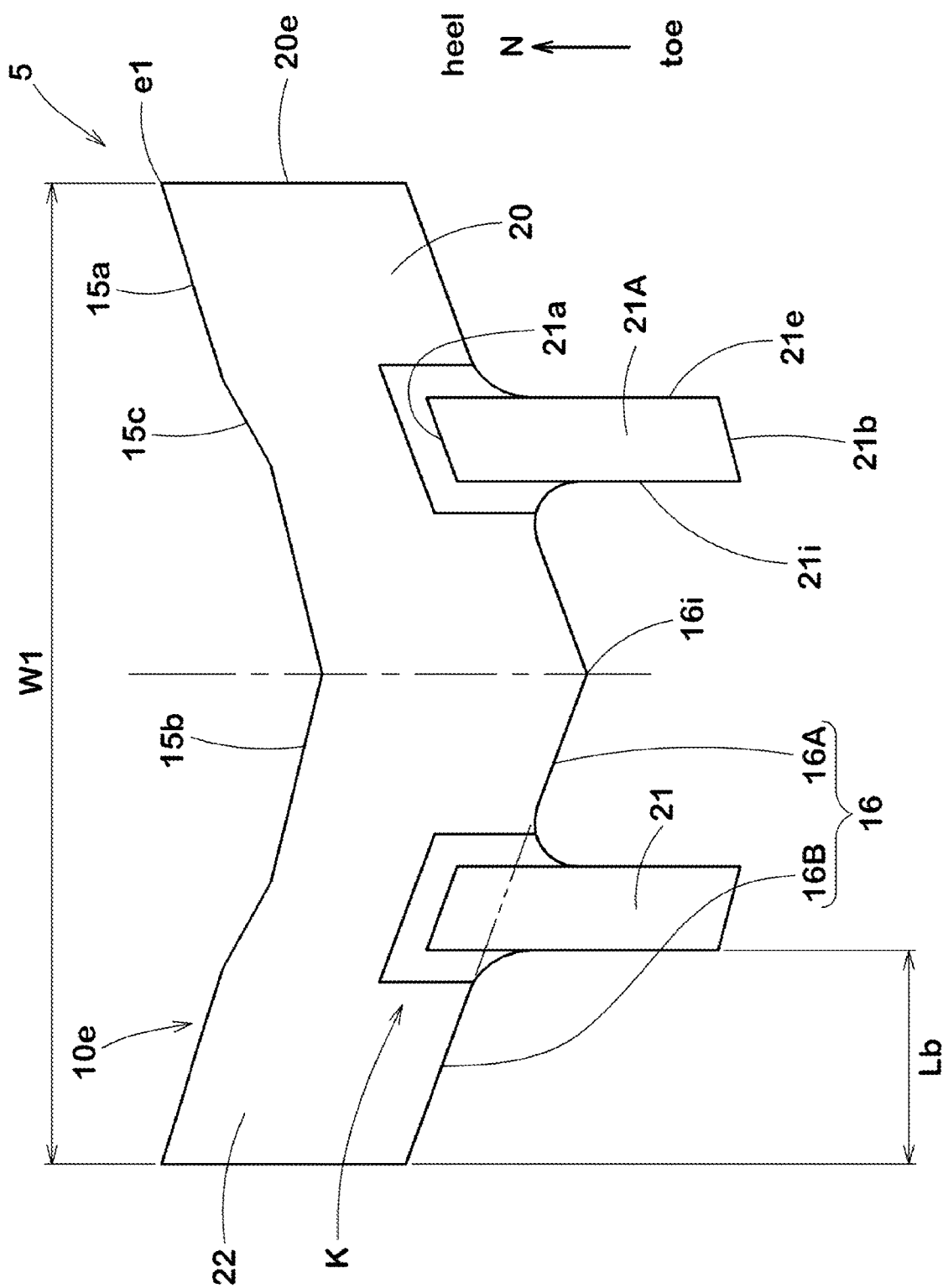
FIG. 5 and FIG. 6 are the same top view of the crown block shown in FIG. 4, but differently provided with reference numerals.

FIG. 5 is a top view of the crown block 5. As shown, the first edge 10e comprises
a pair of first outer portions 15a extending from the axially outer ends e1 of the first edge 10e, respectively,
a first inner portion 15b including the intermediate position e2, and
a pair of first intermediate portions 15c extending between the first outer portions 15a and the first inner portion 15b.

The first intermediate portions 15c are inclined at a larger angle with respect to the tire axial direction than the first outer portions 15a and the first inner portion 15b.

Each of the first outer portions 15a and first intermediate portions 15c extends linearly. The first inner portion 15b is bent at the intermediate position e2 into a V shape.

The second edge 10i comprises
an axially inner edge portion 16A extending axially inwardly from a connection portion K between the crown block main portion 20 and each of the two crown fin portions 21, and an outer edge portion 16B extending axially outwardly from the connection portion K between the crown block main portion 20 and each of the two crown fin portions 21. The axially inner edge portions 16A are connected with each other at the toe-side end 16i of the second edge 10i. The connected axially inner edge portions 16A are bends in a V shape.

Each of the axially outer edge portions 16B extends linearly in this example.

In the present embodiment, each of the two crown fin portions 21 is formed in a parallel quadrilateral shape in the top view of the block.

The crown fin portions 21 in this example each have an outer edge 21e in the block width direction, an inner edge 21i in the block width direction, a heel-side edge 21a on the heel side in the intended tire rotation direction N, and a toe-side edge 21b on the toe side in the intended tire rotation direction N.

The outer edge 21e and the inner edge 21i extend in parallel with the tire circumferential direction in this example.

The heel-side edge 21a is positioned on the heel side of the second edge 10i. Each of the first edge 21a and the second edge 21b extends in parallel with the outer edge portion 16B.

The inner edge 21i, the outer edge 21e, the heel-side edge 21a and the toe-side edge 21b define the radially outer surface 21A of the crown fin portion 21.

Figure 7:
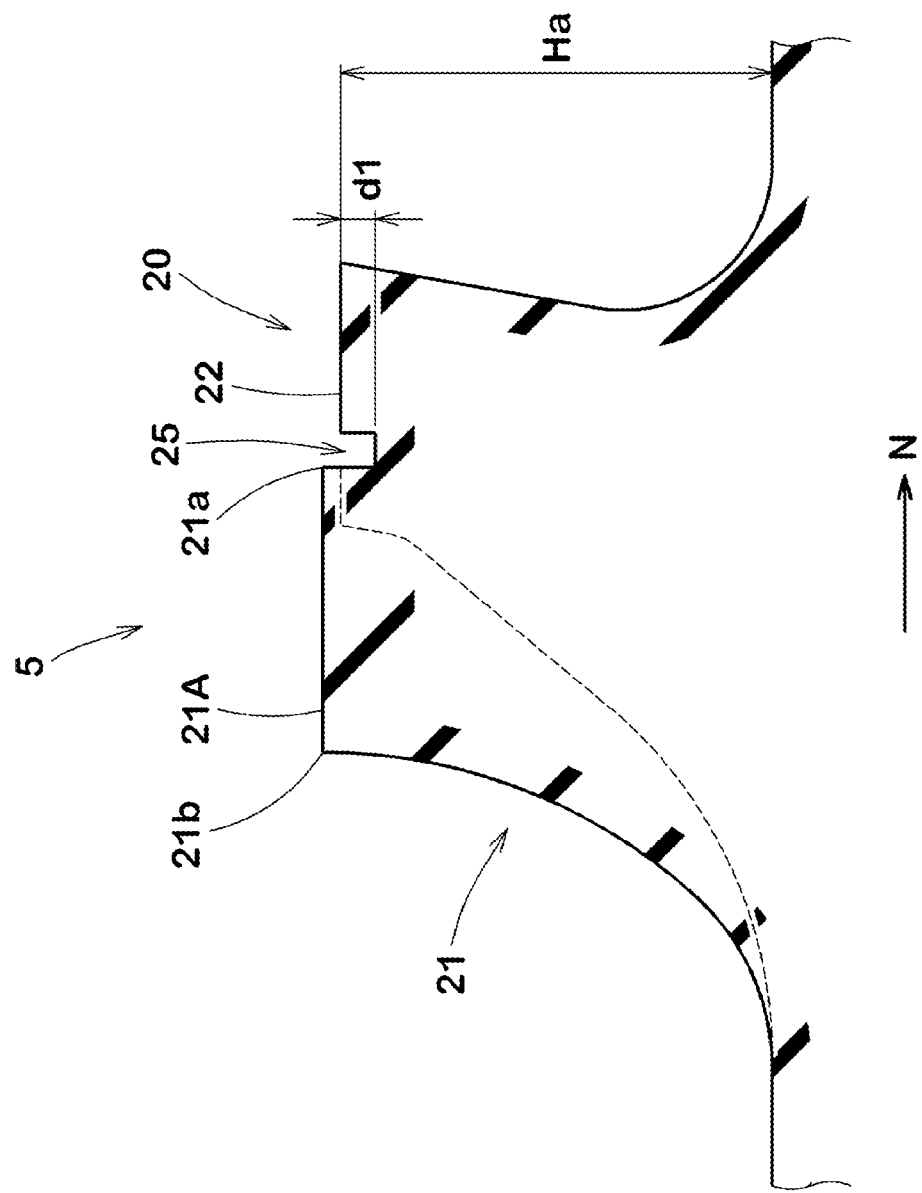
FIG. 7 is a cross-sectional view taken along line B-B of FIG. 6.

In this embodiment, as shown in FIG. 7, the radially outer surface 21A is positioned radially outside the ground contacting top surface 22 of the crown block main portion 20.

However, the radially outer surface 21A may be positioned in the same radial height as the ground contacting top surface 22 of the crown block main portion 20.

Figure 6:
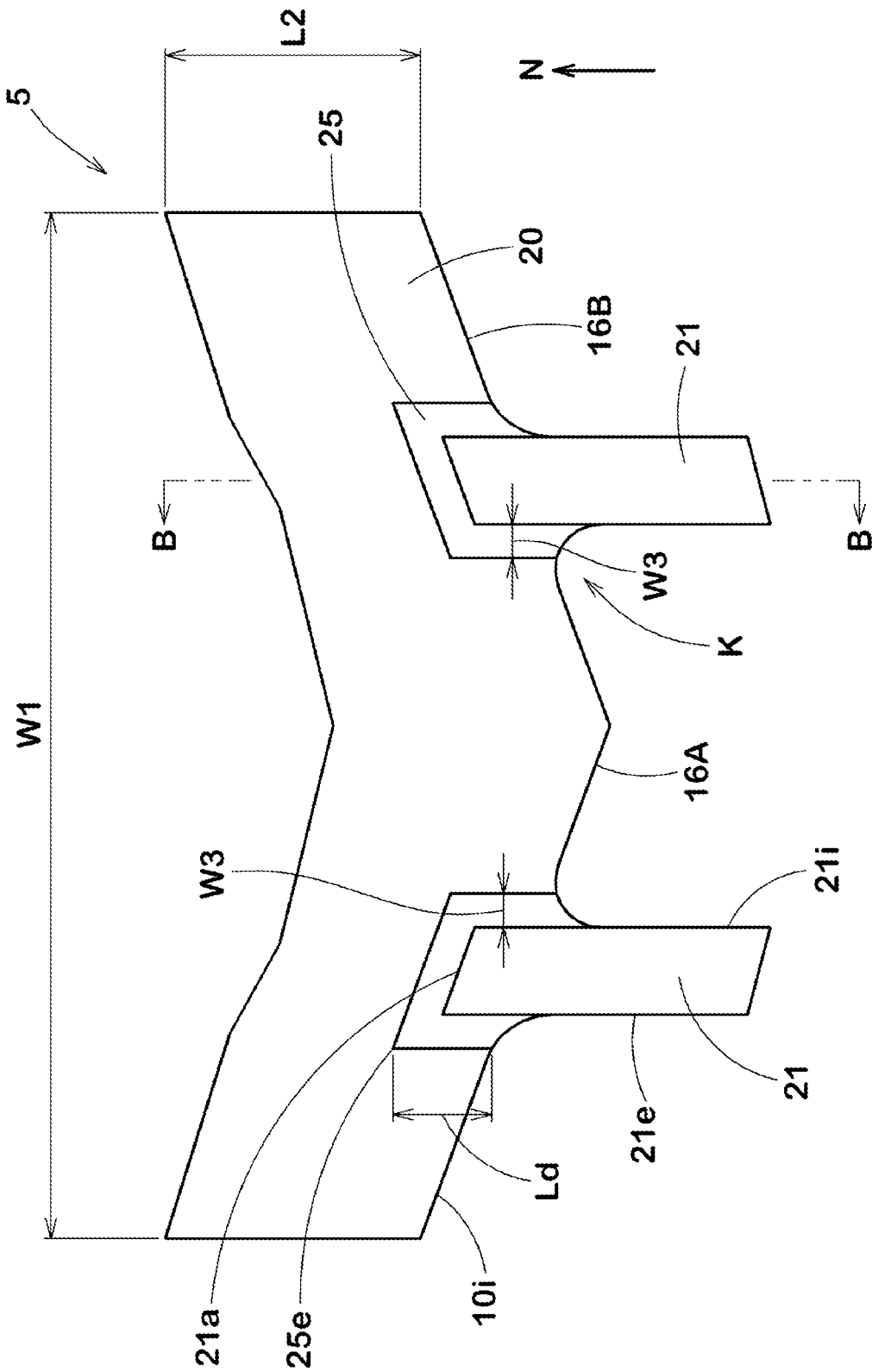

As shown FIGS. 5 and 6, the outer edges 21e of the crown fin portions 21 are located on the inside in the block width direction of the axially outer ends 20e of the crown block main portion 20.

Since such crown block 5 maintains the deformation of the crown fin portions 21 and facilitates ejection of mud clogged between the crown fin portions 21, therefore, the edge effect of the inner edge portion 16A of the crown block main portion 20 is increased in particular.

The distance Lb in the tire axial direction between the outer edge 21e of the crown fin portion 21 and the axially outer end 20e of the crown block main portion 20 is preferably not less than 15%, more preferably not less than 20%, but preferably not more than 35%, more preferably not more than 30% of the width W1 in the tire axial direction of the crown block main portion 20.

Thereby, the deformation of the crown fin portions 21 is ensured, and the effect of ejecting mud is enhanced.

As shown in FIG. 6, the connection portion K between the crown block main portion 20 and the crown fin portion 21 is provided with a shallow groove 25 for promoting deformation of the crown fin portion 21 on the connection portion K side. Such shallow groove 25 helps to smoothly eject the mud clogged between the crown fin portions 21.

The shallow groove 25 extends from the inner edge portion 16A to the outer edge portion 16B of the crown block 5 so as to surround the connection portion K.

In this example, the shallow groove 25 extends along a part of the outer edge 21e, the heel-side edge 21a and a part of the inner edge 21i.

Such shallow groove 25 allows the crown fin portions 21 and the crown block main portion 20 to move almost independently from each other to increase the deformation of the crown fin portion 21, so the traction performance on rough terrain is further enhanced. In this example, the shallow groove 25 extends in a U shape open toward the heel side.

FIG. 7 is a cross-sectional view taken along line B-B of FIG. 6.

As shown, the groove depth dl of the shallow groove 25 is preferably not less than 5%, more preferably not less than 10%, but preferably not more than 25%, more preferably not more than 20% of the block height Ha of the crown block 5.

The width W3 (shown in FIG. 6) of the shallow groove 25 is preferably not less than 2%, more preferably not less than 5%, but preferably not more than 15%, more preferably not more than 10% of the width W1 in the tire axial direction of the crown block main portion 20.

Thereby, the above-mentioned action is effectively exhibited, and the rigidity of the crown fin portions 21 and the crown block main portion 20 is maintained, and large shear forces are ensured.

It is preferable that a distance Ld in the tire circumferential direction between the most heel-side end 25e of the shallow groove 25 and the second edge 10i is not more than 60% of a length L2 in the tire circumferential direction of the crown block main portion 20.

Thereby, the rigidity of the crown block main portion 20 in the tire circumferential direction is maintained, and the effect of suppressing the collapse of the crown block 5 when contacting with the ground is highly exhibited.

The width W1 in the tire axial direction of the crown block main portion 20 is preferably not less than 20%, more preferably not less than 25%, but preferably not more than 40%, more preferably not more than 35% of the developed tread width TW (shown in FIG. 4).

The developed tread width TW is the distance between the tread edges Te measured in the tire axial direction along the tread surface of the tread portion 2.

Figure 8:
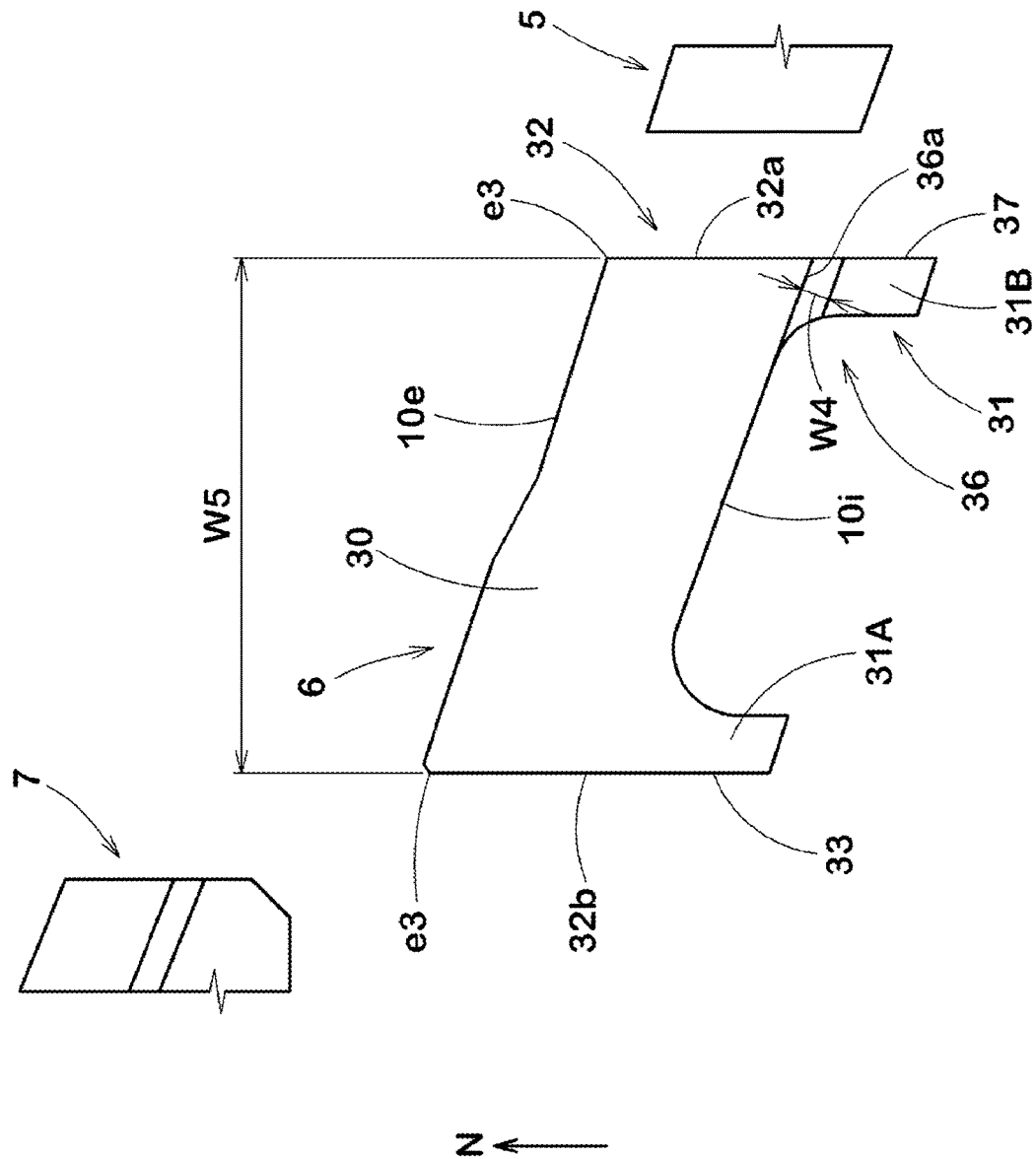
FIG. 8 is a top view of a middle block shown in FIG. 4.

FIG. 8 shows the top view of the middle block 6 and its vicinity.

As shown, in the present embodiment, the middle block 6 is inclined to the heel side in the intended tire rotation direction N from the inside toward the outside in the tire axial direction. The middle block 6 in this example comprises a middle block main portion 30 having a parallel quadrilateral shape in the top view of the block, and a middle fin portion 31 protruding from the middle block main portion 30 toward the toe side in the intended tire rotation direction N.

The middle block main portion 30 has a pair of third edges 32 respectively extending from both ends e3 of the first edge 10e toward the toe side in the intended tire rotation direction N.

The pair of third edges 32 are a third inner edge 32a adjacent to one of the crown blocks 5 in the tire axial direction, and a third outer edge 32b adjacent to one of the shoulder blocks 7 in the tire axial direction.

In this example, the middle fin portion 31 includes an outer middle fin portion 31A connected to the third outer edge 32b, and an inner middle fin portion 31B disposed axially inside the outer middle fin portion 31A.

The outer middle fin portion 31A is directly connected to the middle block main portion 30. The axially outer edge 33 of the outer middle fin portion 31A and the third outer edge 32b of the middle block main portion 30 extend in a straight line.

The inner middle fin portion 31B is connected to the middle block main portion 30, and along the junction between them, a middle shallow groove 36 is formed.

The axially inner edge 37 of the inner middle fin portion 31B and the third inner edge 32a of the middle block main portion 30 extend in a straight line across the middle shallow groove 36.

Since the deformation of the inner middle fin portion 31B is promoted by the middle shallow groove 36, the mud clogged between the middle fin portions 31 can be smoothly removed.

The middle shallow groove 36 has a heel-side groove edge 36a which extends in the longitudinal direction of the groove and forms a part of the second edge 10i of the middle block 6.

The groove width W4 of the middle shallow groove 36 is preferably not less than 80%, more preferably not less than 90%, but preferably not more than 125%, more preferably not more than 110% of the groove width W3 of the shallow groove 25 of the crown block 5.

The groove depth (not shown) of the middle shallow groove 36 is preferably not less than 5%, more preferably not less than 10%, but preferably not more than 20%, more preferably not more than 15% of the block height (not shown) of the middle block main portion 30.

The axial width W5 of the middle block main portion 30 is preferably not less than 5%, more preferably not less than 10%, but preferably not more than 25%, more preferably not more than 20% of the developed tread width TW.

As shown in FIG. 4, the first edge 10e of the middle block 6 is substantially located on a virtual straight line X3 corresponding to an axially outward extension of the first edge 10e of the crown block 5.

Here, the expression "substantially located on a virtual straight line" means not only that the first edge 10e of the middle block 6 coincides with the virtual straight line, but also that the maximum distance Le in the tire circumferential direction between the first edge 10e of the middle block 6 and the virtual straight line X3 is not more than 3 mm.

As a result, the first edge 10e of the middle block 6 and the first edge 10e of the crown block 5 function as one long edge, and a large shearing force is exhibited to enhance the traction performance.

Figure 9:
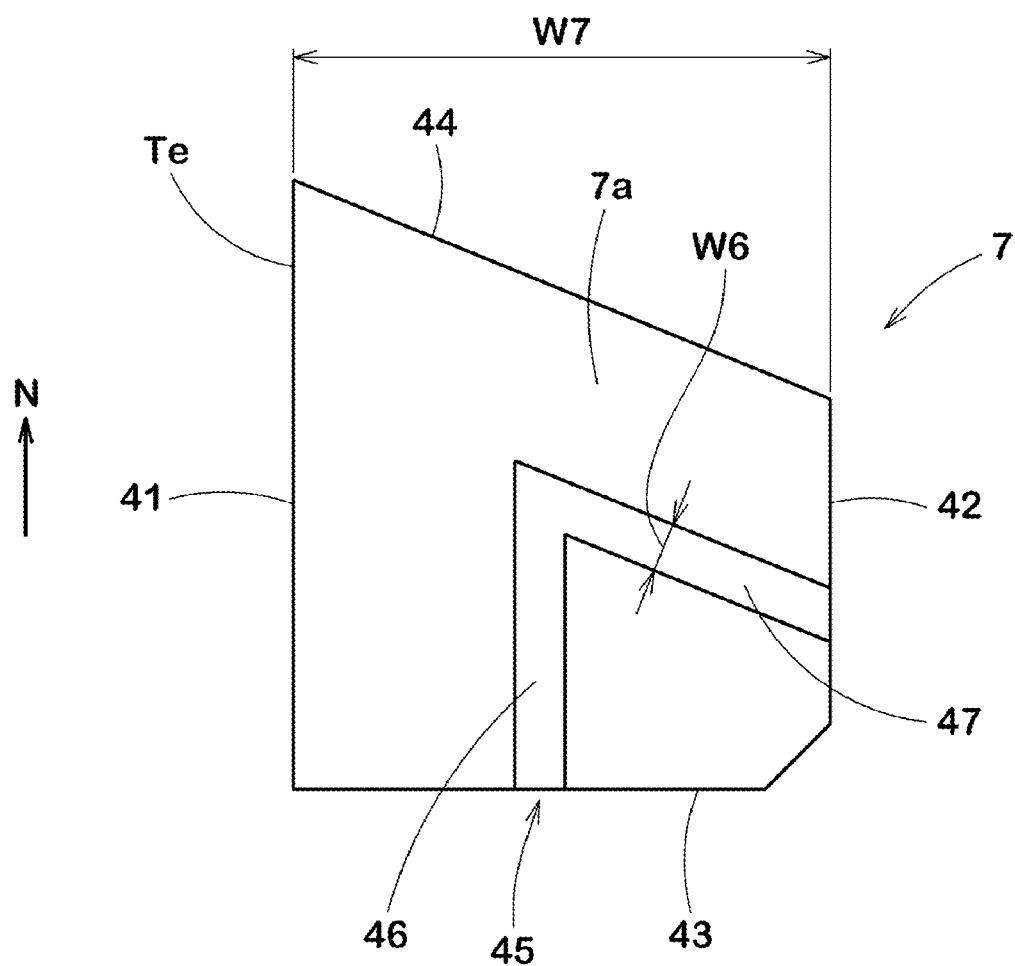
FIG. 9 is a top view of a shoulder block shown in FIG. 4.

FIG. 9 is a top view of one of the shoulder blocks 7.

As shown, the shoulder block 7 in this example is formed in a generally quadrilateral shape, more specifically trapezoidal shape in its top view.

The ground contacting top surface 7a of the shoulder block 7 has an axially outer edge 41, an axially inner edge 42, a toe-side edge 43, and a heel-side edge 44.

The axially outer edge 41 extends in the tire circumferential direction, and in this example, forms a part of the tread edge Te.

The axially inner edge 42 extends in the tire circumferential direction in this example.

The toe-side edge 43 extends in parallel with the tire axial direction from the axially outer edge 41 toward the axially inner edge 42 in this example.

The heel-side edge 44 extends from the axially inner edge 42 to the axially outer edge 41 while inclining with respect to the tire axial direction, for example, toward the intended tire rotation direction N in this example.

Each of the shoulder blocks 7 is provided with a shoulder shallow groove 45 in this example. As shown in FIG. 9, the shoulder shallow groove 45 extends in a V shape in the top view of the shoulder block 7. Such shoulder shallow groove 45 promotes the deformation of the shoulder block 7, and helps to eject the mud clogged between the shoulder block 7 and the adjacent middle block 6.

The shoulder shallow groove 45 is composed of a circumferential portion 46 extending in the tire circumferential direction, and an axial portion 47 extending in the tire axial direction.

The circumferential portion 46 extends at an angle of not more than 45 degrees with respect to the tire circumferential direction.

The axial portion 47 extends at an angle of more than 45 degrees with respect to the tire circumferential direction.

In this example, the circumferential portion 46 extends in parallel with the tire circumferential direction from the toe-side edge 43 toward the heel side in the intended tire rotation direction N, and ends within the shoulder block 7.

In this example, the axial portion 47 extends from the axially inner edge 42 toward the outside in the tire axial direction, and is connected to the end of the circumferential portion 46. The axial portion 47 extends in parallel with the heel-side edge 44. Such shoulder shallow groove 45 further promotes deformation of the shoulder block 7.

The groove width W6 of the shoulder shallow groove 45 is preferably not less than 5%, more preferably not less than 10%, but preferably not more than 25%, more preferably not more than 20% of the axial width W7 (FIG. 9) of the shoulder block 7. The groove depth of the shoulder shallow groove 45 is preferably not less than 5%, more preferably not less than 10%, but preferably not more than 20%, more preferably not more than 15% of the block height of the shoulder block 7 measured from the ground contacting top surface to the tread base portion 2R.

The axial width W7 of the shoulder block 7 is preferably not less than 5%, more preferably not less than 7%, but preferably not more than 20%, more preferably not more than 15% of the developed tread width TW.

It is preferable that the tread rubber (not shown) by which the above-mentioned blocks 5 to 7 are formed has a rubber hardness of not less than 70 degrees, and not more than 90 degrees.

Here, the rubber hardness means the durometer A hardness measured at a temperature of 23 degrees C. according to the Japanese Industrial Standard (JIS) K6253.

While detailed description has been made of a preferable embodiment of the present invention, the present invention can be embodied in various forms without being limited to the illustrated embodiment.

Comparison Tests

Based on the tread pattern shown in FIG. 4, pneumatic tires for a rear wheel of a motorcycle for running on rough terrain were experimentally manufactured as test tires (Working example tires Ex. 1-Ex. 4 and Comprehensive example tires Ref. 1-Ref. 4). Specifications of the test tires are shown in Table 1.

The test tires were tested for the traction performance, instantaneous power performance, and overall performance, using a 450 cc motorcycle for motocross competition having the following rim sizes and tire sizes.

front wheel rim size: 21×1.60
rear wheel rim size: 19×2.15
front tire size: 80/100-21
rear tire size: 120/80-19

In the test, the rear tire was changed, but the front tire was not changed and an identical tire was used. (tire pressure: 80 kPa) The test method was as follows.

<Traction Performance/Instantaneous Power Performance>

The traction performance, instantaneous power performance and overall performance when the above-mentioned motorcycle was run on rough terrain covered with mud were evaluated by the test rider.

Here, the "traction performance" is an evaluation made by the test rider, of the responsiveness of acceleration when the accelerator was opened during running straight and cornering at a constant speed (or the smoothness of acceleration when the speed was further increased from a state where the speed was already sufficiently increased).

The "instantaneous power performance" is an evaluation made by the test rider, of the responsiveness of acceleration when the accelerator was opened during running straight and cornering at low speed (or the smoothness of acceleration when the speed was increased from a state where the speed was low).

The "overall performance" is an evaluation made by the test rider, of the smoothness of running when accelerating during straight running and cornering, and the comfort of the handle response.

The test rider evaluated each performance on a ten-point scale, and the results are shown in Table 1.

TABLE 1

| Tire | Ref. 1 | Ref. 2 | Ref. 3 | Ref. 4 | Ex. 1 | Ex. 2 | Ex. 3 | Ex. 4 |
|---|---|---|---|---|---|---|---|---|
| Ha/H1 (%) | — | — | 20 | 75 | 59 | 59 | 30 | 70 |
| α (deg.) | 0 | 10 | 10 | 10 | 10 | 10 | 10 | 10 |
| θ1 (deg.) | 15.7 | 17.4 | 17.4 | 17.4 | 17.4 | 17.4 | 17.4 | 17.4 |
| Position of middle block first edge | A | A | A | A | A | A | A | A |
| β (deg.) | 30 | 40 | 40 | 10 | 40 | 40 | 40 | 10 |
| hardness of tread rubber (deg.) | 70 | 70 | 70 | 70 | 70 | 70 | 80 | 70 |
| traction performance | 5 | 5.5 | 5.5 | 5 | 6.5 | 7 | 6.5 | 6.5 |

TABLE 1-continued

| Tire | Ref. 1 | Ref. 2 | Ref. 3 | Ref. 4 | Ex. 1 | Ex. 2 | Ex. 3 | Ex. 4 |
|---|---|---|---|---|---|---|---|---|
| instantaneous power performance | 5 | 5 | 5.5 | 5.5 | 6.5 | 7 | 6 | 6 |
| overall performance | 5 | 5.25 | 5.5 | 5 | 6.5 | 7 | 6.5 | 6.5 |

From the test results, it was confirmed that the traction performance and instantaneous power performance on rough terrain of the working example tires were improved as compared with the comparative example tires.

STATEMENT OF THE PRESENT DISCLOSURE

The present disclosure is as follows:

Disclosure 1: A tire for running on rough terrain for which an intended tire rotational direction is specified, and which comprises a tread portion provided with blocks raised from a tread base portion,
wherein
each of the blocks has a ground contacting top surface having a first edge extending in the tire axial direction on the heel side in the tire rotation direction, and a first side wall surface extending radially inwardly from the first edge,
wherein
in a vertical cross section of the block along the tire circumferential direction, the first side wall surface comprises
a radially outer portion extending substantially straight and radially inwardly from the first edge, while inclining toward the toe side in the intended tire rotational direction, and
a radially inner portion extending from the radially outer portion to the tread base portion while curving in an arc shape, and
a length in the tire radial direction of the radially outer portion is in a range from 30% to 70% of a height of the block measured in the tire radial direction from the ground contacting top surface to the tread base portion.

Disclosure 2: The tire for running on rough terrain according to Disclosure 1, wherein
said vertical cross section is that at a center position in the tire axial direction of the block.

Disclosure 3: The tire for running on rough terrain according to Disclosure 1 or 2, wherein
the radius of curvature of the radially inner portion is in a range from 3 to 10 mm.

Disclosure 4: The tire for running on rough terrain according to Disclosure 1, 2 or 3, wherein
in the vertical cross section of the block,
when a first straight line is drawn from the first edge to a position on the first side wall surface which is separated radially inwardly from the first edge by 50% of the radial height of the block,
the angle $\alpha$ of the first straight line is not more than 45 degrees with respect to a straight line drawn normally to the ground contacting top surface at the first edge.

Disclosure 5: The tire for running on rough terrain according to Disclosure 1, 2, 3 or 4,
wherein
the ground contacting top surface has a second edge extending in the tire axial direction on the toe side in the tire rotation direction,
each of the blocks has a second side wall surface extending radially inwardly from the second edge, and
in the vertical cross section, the second side wall surface is inclined toward the toe side in the tire rotation direction from the second edge toward the inside in the tire radial direction.

Disclosure 6: The tire for running on rough terrain according to Disclosure 5, wherein
in the vertical cross section, the angle $\beta$ of a second straight line drawn from the second edge to a position on the second side wall surface separated radially inwardly from the second edge by 50% of the block height, with respect to a straight line drawn normally to the ground contacting top surface at the second edge is larger than the angle $\alpha$ of a first straight line drawn from the first edge to a position on the first side wall surface separated radially inwardly from the first edge by 50% of the block height, with respect to a straight line drawn normally to the ground contacting top surface at the first edge.

Disclosure 7: The tire for running on rough terrain according to Disclosure 6, wherein
the angle $\beta$ is in a range from 5 to 75 degrees.

Disclosure 8: The tire for running on rough terrain according to any one of Disclosures 1 to 7, wherein
the blocks include a crown block disposed on the tire equator, and
the first edge of the crown block is formed in a V shape convex toward the toe side in the intended tire rotation direction.

Disclosure 9: The tire for running on rough terrain according to Disclosure 8, wherein
the angle of the first edge of the crown block with respect to the tire axial direction is in a range from 10 to 45 degrees.

Disclosure 10: The tire for running on rough terrain according to Disclosure 8 or 9,
wherein
the blocks include a middle block located axially outside the crown block, and
the first edge of the middle block is substantially located on a virtual straight line extended axially outwardly from the first edge of the crown block.

DESCRIPTION OF THE REFERENCE SIGNS 1 tire for running on rough terrain
2 tread portion
2R tread base portion
4 block
11 first side wall surface
13 radially outer portion
14 radially Inner portion
H1 radially outer portion length
Ha block height
N intended tire rotation direction

The invention claimed is:
1. A tire for running on rough terrain for which an intended tire rotational direction is specified, and which comprises a tread portion provided with blocks raised from a tread base portion, wherein
each of the blocks has
a ground contacting top surface having a first edge extending in the tire axial direction on the heel side in the tire rotation direction, and
a first side wall surface extending radially inwardly from the first edge,
in a vertical cross section of the block along the tire circumferential direction, the first side wall surface comprises a radially outer portion extending substantially straight and radially inwardly from the first edge, while inclining toward the toe side in the intended tire rotational direction, and a radially inner portion extending from the radially outer portion to the tread base portion while curving in an arc shape, and a length in the tire radial direction of the radially outer portion is in a range from 30% to 70% of a height of the block measured in the tire radial direction from the ground contacting top surface to the tread base portion, the blocks include crown blocks each comprising a crown block main portion formed in a V shape convex toward the toe side in the intended tire rotation direction, and two crown fin portions protruding from the crown block main portion toward the toe side in the intended tire rotation direction, wherein a radially outer surface of each of the crown fin portions is positioned radially outside a radially outer surface of the crown block main portion constituting said ground contacting top surface, and between the crown block main portion and each of the crown fin portions, a shallow groove is provided, wherein the shallow groove has a groove depth of not less than 5% and not more than 25% of the height of the crown block measured in the tire radial direction from the ground contacting top surface to the tread base portion, and a groove width of not less than 2% and not more than 15% of a width in the tire axial direction of the crown block main portion.

2. The tire for running on rough terrain according to claim 1, wherein said vertical cross section is that at a center position in the tire axial direction of the block.

3. The tire for running on rough terrain according to claim 2, wherein a radius of curvature of the radially inner portion is in a range from 3 to 10 mm.

4. The tire for running on rough terrain according to claim 2, wherein in the vertical cross section of the block, when a first straight line is drawn from the first edge to a position on the first side wall surface which is separated radially inwardly from the first edge by 50% of the radial height of the block, the angle α of the first straight line is not more than 45 degrees with respect to a straight line drawn normally to the ground contacting top surface at the first edge.

5. The tire for running on rough terrain according to claim 2, wherein the ground contacting top surface has a second edge extending in the tire axial direction on the toe side in the tire rotation direction, each of the blocks has a second side wall surface extending radially inwardly from the second edge, and in the vertical cross section, the second side wall surface is inclined toward the toe side in the tire rotation direction from the second edge toward the inside in the tire radial direction.

6. The tire for running on rough terrain according to claim 1, wherein a radius of curvature of the radially inner portion is in a range from 3 to 10 mm.

7. The tire for running on rough terrain according to claim 6, wherein in the vertical cross section of the block, when a first straight line is drawn from the first edge to a position on the first side wall surface which is separated radially inwardly from the first edge by 50% of the radial height of the block, the angle α of the first straight line is not more than 45 degrees with respect to a straight line drawn normally to the ground contacting top surface at the first edge.

8. The tire for running on rough terrain according to claim 6, wherein the ground contacting top surface has a second edge extending in the tire axial direction on the toe side in the tire rotation direction, each of the blocks has a second side wall surface extending radially inwardly from the second edge, and in the vertical cross section, the second side wall surface is inclined toward the toe side in the tire rotation direction from the second edge toward the inside in the tire radial direction.

9. The tire for running on rough terrain according to claim 1, wherein in the vertical cross section of the block, when a first straight line is drawn from the first edge to a position on the first side wall surface which is separated radially inwardly from the first edge by 50% of the radial height of the block, the angle α of the first straight line is not more than 45 degrees with respect to a straight line drawn normally to the ground contacting top surface at the first edge.

10. The tire for running on rough terrain according to claim 9, wherein the ground contacting top surface has a second edge extending in the tire axial direction on the toe side in the tire rotation direction, each of the blocks has a second side wall surface extending radially inwardly from the second edge, and in the vertical cross section, the second side wall surface is inclined toward the toe side in the tire rotation direction from the second edge toward the inside in the tire radial direction.

11. The tire for running on rough terrain according to claim 10, wherein in the vertical cross section, the angle β of a second straight line drawn from the second edge to a position on the second side wall surface separated radially inwardly from the second edge by 50% of the block height, with respect to a straight line drawn normally to the ground contacting top surface at the second edge is larger than the angle α of a first straight line drawn from the first edge to a position on the first side wall surface separated radially inwardly from the first edge by 50% of the block height, with respect to a straight line drawn normally to the ground contacting top surface at the first edge.

12. The tire for running on rough terrain according to claim 11, wherein the angle β is in a range from 5 to 75 degrees.

13. The tire for running on rough terrain according to claim 1, wherein the ground contacting top surface has a second edge extending in the tire axial direction on the toe side in the tire rotation direction, each of the blocks has a second side wall surface extending radially inwardly from the second edge, and in the vertical cross section, the second side wall surface is inclined toward the toe side in the tire rotation direction from the second edge toward the inside in the tire radial direction.

14. The tire for running on rough terrain according to claim 13, wherein in the vertical cross section, the angle β of a second straight line drawn from the second edge to a position on the second side wall surface separated radially inwardly from the second edge by 50% of the block height, with respect to a straight line drawn normally to the ground contacting top surface at the second edge is larger than the angle α of a first straight line drawn from the first edge to a position on the first side wall surface separated radially inwardly from the first edge by 50% of the block height, with respect to a straight line drawn normally to the ground contacting top surface at the first edge.

15. The tire for running on rough terrain according to claim 14, wherein the angle β is in a range from 5 to 75 degrees.

16. The tire for running on rough terrain according to claim 1, wherein the angle of the first edge of the crown block with respect to the tire axial direction is in a range from 10 to 45 degrees.

17. The tire for running on rough terrain according to claim 1, wherein
the blocks include a first middle block and a second middle block located on one side and the other side in the tire axial direction, respectively, of each of the crown blocks, and
said each of the crown blocks, the first middle block and the second middle block are arranged in a V-formation.

18. The tire for running on rough terrain according to claim 17, wherein each of the first and second middle blocks comprises
a middle block main portion having a substantially parallel quadrilateral shape in its top view, and
a middle fin portion protruding from the middle block main portion toward the toe side in the intended tire rotation direction.

19. The tire for running on rough terrain according to claim 18, wherein between the middle block main portion and the middle fin portion, a middle shallow groove is provided.

20. The tire for running on rough terrain according to claim 19, wherein
said middle fin portion includes an axially outer middle fin portion and an axially inner middle fin portion, and
the middle shallow groove is provided between the middle block main portion and only the axially inner middle fin portion.

\* \* \* \* \*